US012307781B2

(12) United States Patent
Anabuki et al.

(10) Patent No.: US 12,307,781 B2
(45) Date of Patent: May 20, 2025

(54) INFORMATION PROCESSING DEVICE AND INFORMATION PROCESSING METHOD ASSOCIATED WITH COMPRESSION OF POINT CLOUD DATA OBTAINED BY SENSING THE VICINITY OF A MOVING BODY

(71) Applicant: Panasonic Intellectual Property Management Co., Ltd., Osaka (JP)

(72) Inventors: Motoshi Anabuki, Hyogo (JP); Yoshimasa Honda, Hyogo (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 403 days.

(21) Appl. No.: 17/690,677

(22) Filed: Mar. 9, 2022

(65) Prior Publication Data

US 2022/0198810 A1    Jun. 23, 2022

Related U.S. Application Data

(63) Continuation of application No. PCT/JP2021/009691, filed on Mar. 10, 2021.

(30) Foreign Application Priority Data

Apr. 1, 2020  (JP) ................. 2020-066082

(51) Int. Cl.
*G06V 20/58*   (2022.01)
*G06T 9/00*    (2006.01)
*G06V 10/25*   (2022.01)

(52) U.S. Cl.
CPC ............... *G06V 20/58* (2022.01); *G06T 9/00* (2013.01); *G06V 10/25* (2022.01); *G06T 2207/10028* (2013.01); *G06T 2207/30252* (2013.01)

(58) Field of Classification Search
None
See application file for complete search history.

(56) References Cited

U.S. PATENT DOCUMENTS

2019/0163958 A1   5/2019  Li et al.
2020/0288161 A1   9/2020  Wang et al.

FOREIGN PATENT DOCUMENTS

EP      3 536 556      9/2019
JP      2009-258058    11/2009
(Continued)

OTHER PUBLICATIONS

Extended European Search Report issued Aug. 10, 2023 in corresponding European Patent Application No. 21781954.9.
(Continued)

*Primary Examiner* — Lennin R RodriguezGonzalez
(74) *Attorney, Agent, or Firm* — Wenderoth, Lind & Ponack, L.L.P.

(57) ABSTRACT

An information processing device includes a point cloud data obtainer that obtains point cloud data obtained by sensing a vicinity of a moving body or stored in a point cloud database; a traffic information obtainer that obtains traffic information in the vicinity of the moving body; a determiner that determines a specific area included in the vicinity of the moving body based on the traffic information; a compressor that executes compression control on first point cloud data and second point cloud data differently from each other, the first point cloud data and the second point cloud data being included in the point cloud data, the first point cloud data being associated with the specific area, the second point cloud data being associated with an area other than the specific area; and an outputter that outputs compressed data obtained by executing the compression control on the point cloud data.

14 Claims, 12 Drawing Sheets

(56) References Cited

FOREIGN PATENT DOCUMENTS

| | | |
|---|---|---|
| JP | 2018-116452 | 7/2018 |
| JP | 2018-136890 | 8/2018 |
| WO | 2019/103009 | 5/2019 |

OTHER PUBLICATIONS

International Search Report (ISR) issued on Jun. 1, 2021 in International (PCT) Application No. PCT/JP2021/009691.

| Travel mode | Compression (Downsampling voxel size) |
|---|---|
| Fully autonomous | 2 m |
| Remote monitoring | 1 m |
| Remote operation | 0.5 m |

FIG. 12

| Details of processing | Compression (Downsampling voxel size) |
|---|---|
| Own position estimation | 2 m |
| Obstacle monitoring | 1 m |

FIG. 13

| Result of processing (Number of obstacles) | Compression (Downsampling voxel size) |
|---|---|
| Small | 2 m |
| Large | 1 m |

| Travel information | Compression (Downsampling voxel size) |
|---|---|
| While traveling | 0.5 m |
| While not traveling | 3 m |

INFORMATION PROCESSING DEVICE AND INFORMATION PROCESSING METHOD ASSOCIATED WITH COMPRESSION OF POINT CLOUD DATA OBTAINED BY SENSING THE VICINITY OF A MOVING BODY

CROSS REFERENCE TO RELATED APPLICATIONS

This is a continuation application of PCT International Application No. PCT/JP2021/009691 filed on Mar. 10, 2021, designating the United States of America, which is based on and claims priority of Japanese Patent Application No. 2020-066082 filed on Apr. 1, 2020. The entire disclosures of the above-identified applications, including the specifications, drawings and claims are incorporated herein by reference in their entirety.

FIELD

The present disclosure relates to an information processing device and an information processing method associated with compression of the point cloud data obtained by sensing the vicinity of a moving body.

BACKGROUND

With respect to a moving body such as an autonomous driving vehicle, the following are conceivable. The point cloud data obtained by sensing the vicinity of the moving body is transmitted to a server capable of more advanced processing than the moving body. The server is caused to perform the advanced processing related to a movement of the moving body. Such point cloud data is compressed to be transmitted to the server with a low delay. For example, Patent Literature (PTL) 1 discloses compressing point cloud data using an encryption technique. On the other hand, for example, PTL 2 discloses changing how to compress point cloud data based on local information.

CITATION LIST

Patent Literature

PTL 1: International Publication No. WO 2019/103009
PTL 2: Japanese Unexamined Patent Application Publication No. 2018-116452

SUMMARY

Technical Problem

However, the techniques of compressing point cloud data disclosed in PTLs 1 and 2 may be unsuitable for the travel of a moving body.

To address the problem, the present disclosure provides an information processing device, for example, that allows compression of point cloud data suitable for the travel of a moving body.

Solution to Problem

An information processing device according to the present disclosure includes: a point cloud data obtainer that obtains point cloud data obtained by sensing a vicinity of a moving body or stored in a point cloud database; a traffic information obtainer that obtains traffic information in the vicinity of the moving body; a determiner that determines a specific area included in the vicinity of the moving body based on the traffic information; a compressor that executes compression control on first point cloud data and second point cloud data differently from each other, the first point cloud data and the second point cloud data being included in the point cloud data, the first point cloud data being associated with the specific area, the second point cloud data being associated with an area other than the specific area; and an outputter that outputs compressed data obtained by executing the compression control on the point cloud data.

This general and specific aspect may be implemented using a system, a method, an integrated circuit, a computer program, or a computer-readable recording medium such as a CD-ROM, or any combination of systems, methods, integrated circuits, computer programs, or recording media.

Advantageous Effects

An information processing device according to an aspect of the present disclosure allows compression of point cloud data suitable for travel of a moving body.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 12 illustrates an example operation of the information processing device according to Embodiment 5.

FIG. 13 illustrates another example operation of the information processing device according to Embodiment 5.

DESCRIPTION OF EMBODIMENTS

Figure 1:
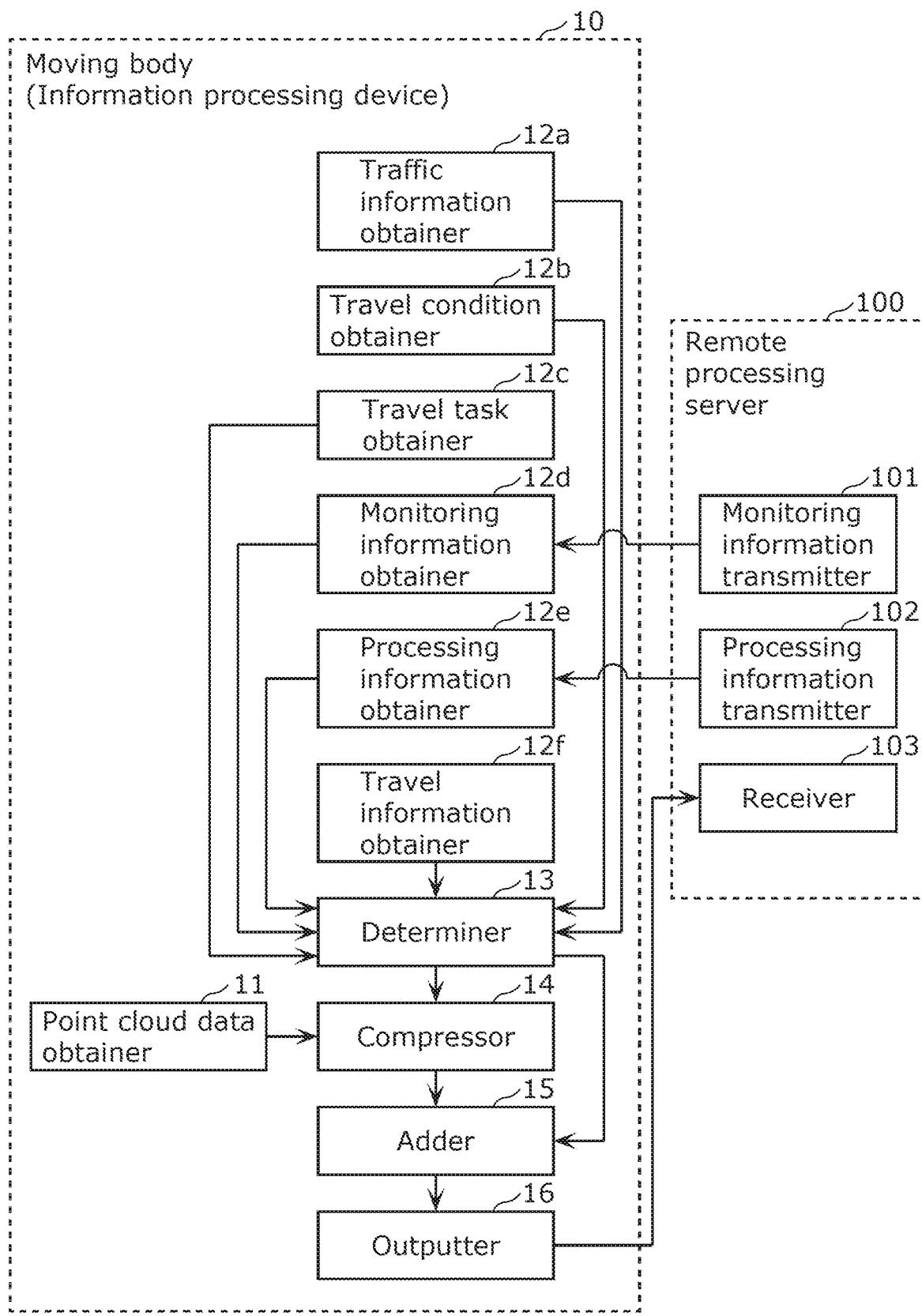
FIG. 1 is a block diagram showing an example of a moving body and a remote processing server according to an embodiment.

An information processing device according to an aspect of the present disclosure includes: a point cloud data obtainer that obtains point cloud data obtained by sensing a vicinity of a moving body or stored in a point cloud database; a traffic information obtainer that obtains traffic information in the vicinity of the moving body; a determiner that determines a specific area included in the vicinity of the moving body based on the traffic information; a compressor that executes compression control on first point cloud data and second point cloud data differently from each other, the first point cloud data and the second point cloud data being included in the point cloud data, the first point cloud data being associated with the specific area, the second point cloud data being associated with an area other than the specific area; and an outputter that outputs compressed data obtained by executing the compression control on the point cloud data.

Accordingly, the point cloud is not deleted or reduced by a smaller amount in a certain area included in the vicinity of the moving body, and deleted or reduced by a larger amount in the other area included in the vicinity of the moving body, based on the traffic information in the vicinity of the moving body. That is, compression of the point cloud data suitable for the travel of the moving body is possible based on the traffic information in the vicinity of the moving body.

For example, the traffic information may include map information or traffic jam information.

This configuration determines the area in which the point cloud is not deleted or reduced by a smaller amount, or the area in which the point cloud is deleted or reduced by a larger amount, based on the map information or the traffic jam information. Accordingly, the amount of the point cloud can be controlled in the area important for the travel of the moving body differently from the other area. The efficiency in processing the point cloud data increases with the travel performance maintained.

For example, the specific area may have a higher probability of an incident than the area other than the specific area.

Accordingly, the point cloud is not deleted or reduced by a smaller amount in, as the specific area, the area with a higher probability of an incident. Accordingly, the efficiency in processing the point cloud data increases with the travel safety or comfortability maintained.

An information processing device according to another aspect of the present disclosure includes: a point cloud data obtainer that obtains point cloud data obtained by sensing a vicinity of a moving body or stored in a point cloud database; a travel condition obtainer that obtains a travel condition of the moving body; a determiner that determines a specific area included in the vicinity of the moving body based on the travel condition; a compressor that executes compression control on first point cloud data and second point cloud data differently from each other, the first point cloud data and the second point cloud data being included in the point cloud data, the first point cloud data being associated with the specific area, the second point cloud data being associated with an area other than the specific area; and an outputter that outputs compressed data obtained by executing the compression control on the point cloud data Accordingly, the point cloud is not deleted or reduced by a smaller amount in a certain area included in the vicinity of the moving body, and deleted or reduced by a larger amount in the other area included in the vicinity of the moving body, based on the travel condition of the moving body. That is, the compression of the point cloud data suitable for the travel of the moving body is possible based on the travel condition of the moving body.

For example, the travel condition may include a speed, a steering angle, or an accuracy in estimating an own position of the moving body.

This configuration determines the area in which the point cloud is not deleted or reduced by a smaller amount, or the area in which the point cloud is deleted or reduced by a larger amount, based on the speed, steering angle, or accuracy in estimating the own position of the moving body. Accordingly, the amount of the point cloud can be controlled in the area important for the travel of the moving body differently from the other area. The efficiency in processing the point cloud data increases with the travel performance maintained.

For example, the specific area may be an area within a stopping distance of the moving body.

Accordingly, the point cloud is not deleted or reduced by a smaller amount in the specific area within a stopping distance of the moving body. Accordingly, the efficiency in processing the point cloud data increases with the travel safety or comfortability maintained.

An information processing device according to further another aspect of the present disclosure includes: a point cloud data obtainer that obtains point cloud data obtained by sensing a vicinity of a moving body or stored in a point cloud database; a travel task obtainer that obtains a travel task of the moving body; a determiner that determines a specific area included in the vicinity of the moving body based on the travel task; a compressor that executes compression control on first point cloud data and second point cloud data differently from each other, the first point cloud data and the second point cloud data being included in the point cloud data, the first point cloud data being associated with the specific area, the second point cloud data being associated with an area other than the specific area; and an outputter that outputs compressed data obtained by executing the compression control on the point cloud data.

Accordingly, the point cloud is not deleted or reduced by a smaller amount in a certain area included in the vicinity of the moving body, and deleted or reduced by a larger amount in the other area included in the vicinity of the moving body, based on the travel task of the moving body. That is, the compression of the point cloud data suitable for the travel of the moving body is possible based on the travel task of the moving body.

For example, the travel task may include a task of turning right or left, changing lanes, or acceleration or deceleration.

This configuration determines the area in which the point cloud is not deleted or reduced by a smaller amount, or the area in which the point cloud is deleted or reduced by a larger amount, based on the task of the moving body such as turning right or left, changing lanes, or acceleration or deceleration. Accordingly, the amount of the point cloud can be controlled in the area important for the travel of the moving body differently from the other area. The efficiency in processing the point cloud data increases with the travel performance maintained.

For example, the specific area may be an area in which the moving body travels while executing the travel task.

Accordingly, the point cloud is not deleted or reduced by a smaller amount in the specific area in which the moving body travels while executing the travel task. Accordingly, the efficiency in processing the point cloud data increases with the travel safety or comfortability maintained.

An information processing device according to yet another aspect of the present disclosure includes: a point cloud data obtainer that obtains point cloud data obtained by sensing a vicinity of a moving body or stored in a point cloud database; a monitoring information obtainer that obtains monitoring information from an observer of the moving body or an object in the vicinity of the moving body; a determiner that determines a specific area included in the vicinity of the moving body based on the monitoring information; a compressor that executes compression control on first point cloud data and second point cloud data differently from each other, the first point cloud data and the second point cloud data being included in the point cloud data, the first point cloud data being associated with the specific area, the second point cloud data being associated with an area other than the specific area; and an outputter that outputs compressed data obtained by executing the compression control on the point cloud data.

Accordingly, the point cloud is not deleted or reduced by a smaller amount in a certain area included in the vicinity of the moving body, and deleted or reduced by a larger amount in the other area included in the vicinity of the moving body, based on the monitoring information. That is, the compression of the point cloud data suitable for the travel of the moving body is possible based on the monitoring information.

For example, the monitoring information may include information indicating a range monitored by the observer or information indicating a range monitored by the object.

This configuration determines the area in which the point cloud is not deleted or reduced by a smaller amount, or the area in which the point cloud is deleted or reduced by a larger amount, based on the following information. The information indicates the range monitored by the observer or the range monitored by the object. Accordingly, the amount of the point cloud can be controlled in the area important for the moving body monitored during the travel of the moving body differently from the other area. The efficiency in processing the point cloud data increases with the travel performance maintained.

For example, the specific area may be a range monitored by the observer or an overlap between the range monitored by the observer and a range monitored by the object.

Accordingly, the point cloud is not deleted or reduced by a smaller amount in, as the specific area, the range monitored by the observer. Alternatively, the point cloud is deleted or reduced by a larger amount in, as the specific area, the overlap between the range monitored by the observer and the range monitored by the object. Accordingly, the efficiency in processing the point cloud data increases with the travel safety or comfortability maintained.

For example, the compressor may execute the compression control (i) to compress one of the first point cloud data and the second point cloud data and not compress a remaining one of the first point cloud data and the second point cloud data or (ii) to vary a reduction amount of the point cloud between the first point cloud data and the second point cloud data.

In this manner, the compression control is executed (i) to compress one of the first and second point cloud data and not compress the other of the first and second point cloud data or (ii) to vary a reduction amount of the point cloud between the first and second point cloud data. Accordingly, the compression of the point cloud data suitable for the travel of the moving body is possible.

For example, the information processing device may further include: an adder that adds additional information on the compression control to the compressed data.

With this configuration, the compressed data is added with the additional information on the compression control so as to be handled easily. For example, how to process the compressed data is determined based on the additional information.

An information processing method according to an aspect of the present disclosure is to be executed by a computer. The information processing method includes: obtaining point cloud data obtained by sensing a vicinity of a moving body or stored in a point cloud database; obtaining traffic information in the vicinity of the moving body; determining a specific area included in the vicinity of the moving body based on the traffic information; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained in the executing of the compression control on the point cloud data.

Accordingly, the information processing method is provided which allows the compression of the point cloud data suitable for the travel of the moving body.

An information processing method according to another aspect of the present disclosure is to be executed by a computer. The information processing method includes: obtaining point cloud data obtained by sensing a vicinity of a moving body or stored in a point cloud database; obtaining a travel condition of the moving body; determining a specific area included in the vicinity of the moving body based on the travel condition; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained in the executing of the compression control on the point cloud data.

Accordingly, the information processing method is provided which allows the compression of the point cloud data suitable for the travel of the moving body.

An information processing method according to further another aspect of the present disclosure is to be executed by a computer. The information processing method includes: obtaining point cloud data obtained by sensing a vicinity of a moving body or stored in a point cloud database; obtaining a travel task of the moving body; determining a specific area included in the vicinity of the moving body based on the travel task; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained in the executing of the compression control on the point cloud data.

Accordingly, the information processing method is provided which allows the compression of the point cloud data suitable for the travel of the moving body.

An information processing method according to yet another aspect of the present disclosure is to be executed by a computer. The information processing method includes: obtaining point cloud data obtained by sensing a vicinity of a moving body or stored in a point cloud database; obtaining monitoring information from an observer of the moving body or an object in the vicinity of the moving body;

determining a specific area included in the vicinity of the moving body based on based on the monitoring information; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained in the executing of the compression control on the point cloud data.

Accordingly, the information processing method is provided which allows the compression of the point cloud data suitable for the travel of the moving body.

An information processing device according to an aspect of the present disclosure includes: a point cloud data obtainer that obtains point cloud data obtained by sensing a vicinity of a moving body or stored in a point cloud database; a traffic information obtainer that obtains traffic information in the vicinity of the moving body; a determiner that determines a compression mode of the point cloud data based on the traffic information; a compressor that executes compression control on the point cloud data in the compression mode determined; and an outputter that outputs compressed data obtained by executing the compression control on the point cloud data.

Accordingly, the compression of the point cloud data suitable for the travel of the moving body is possible based on the traffic information in the vicinity of the moving body.

An information processing device according to another aspect of the present disclosure includes: a point cloud data obtainer that obtains point cloud data obtained by sensing a vicinity of a moving body or stored in a point cloud database; a travel condition obtainer that obtains a travel condition of the moving body; a determiner that determines a compression mode of the point cloud data based on the travel condition; a compressor that executes compression control on the point cloud data in the compression mode determined; and an outputter that outputs compressed data obtained by executing the compression control on the point cloud data.

Accordingly, the compression of the point cloud data suitable for the travel of the moving body is possible based on the travel condition of the moving body.

An information processing device according to further another aspect of the present disclosure includes: a point cloud data obtainer that obtains point cloud data obtained by sensing a vicinity of a moving body or stored in a point cloud database; a travel task obtainer that obtains a travel task of the moving body; a determiner that determines a compression mode of the point cloud data based on the travel task; a compressor that executes compression control on the point cloud data in the compression mode determined; and an outputter that outputs compressed data obtained by executing the compression control on the point cloud data.

Accordingly, the compression of the point cloud data suitable for the travel of the moving body is possible based on the travel task of the moving body.

An information processing device according to yet another aspect of the present disclosure includes: a point cloud data obtainer that obtains point cloud data obtained by sensing a vicinity of a moving body or stored in a point cloud database; a monitoring information obtainer that obtains monitoring information from an observer of the moving body or an object in the vicinity of the moving body; a determiner that determines a compression mode of the point cloud data based on the monitoring information; a compressor that executes compression control on the point cloud data in the compression mode determined; and an outputter that outputs compressed data obtained by executing the compression control on the point cloud data.

Accordingly, the compression of the point cloud data suitable for the travel of the moving body is possible based on the monitoring information.

An information processing device according to still another aspect of the present disclosure includes: a point cloud data obtainer that obtains point cloud data obtained by sensing a vicinity of a moving body or stored in a point cloud database; a processing information obtainer that obtains processing information indicating a detail or a result of processing for autonomous driving of the moving body; a determiner that determines a compression mode of the point cloud data based on the processing information; a compressor that executes compression control on the point cloud data in the compression mode determined; and an outputter that outputs compressed data obtained by executing the compression control on the point cloud data.

Accordingly, the compression of the point cloud data suitable for the travel of the moving body is possible based on the processing information on the autonomous driving of the moving body. That is, the compression of the point cloud data suitable for the processing of the autonomous driving is possible. For example, the point cloud is not compressed or compressed at a lower degree with respect to the processing requiring a higher precision or accuracy, whereas the point cloud is compressed completely or at a higher degree with respect to the other processing. For example, depending on the amount or type of the processing as a result, whether the compression is executed or the degree of compression can be controlled.

An information processing device according to even another aspect of the present disclosure includes: a point cloud data obtainer that obtains point cloud data obtained by sensing a vicinity of a moving body or stored in a point cloud database; a travel information obtainer that obtains travel information on the moving body obtains processing information indicating a detail or a result of processing for autonomous driving of the moving body; a determiner that determines a compression mode of the point cloud data based on the travel information; a compressor that executes compression control on the point cloud data in the compression mode determined; and an outputter that outputs compressed data obtained by executing the compression control on the point cloud data.

Accordingly, the compression of the point cloud data suitable for the travel of the moving body is possible based on the travel information on the moving body. The compression of the point cloud data suitable for the travel state of the moving body is possible. For example, the point cloud data is not compressed or compressed at a lower degree in a state where the moving body is likely to be in a danger such as an incident, and the point cloud data is compressed completely or at a higher degree in other states.

Now, embodiments will be described in detail with reference to the drawings.

Note that the embodiments described below are mere comprehensive or specific examples. The numerical values, shapes, materials, constituent elements, the arrangement and connection of the constituent elements, steps, step orders etc. shown in the following embodiments are thus mere examples, and are not intended to limit the scope of the present disclosure.

Embodiments

[Configuration]

FIG. 1 is a block diagram showing an example of a moving body (specifically, information processing device 10 mounted on the moving body) and remote processing server 100 according to an embodiment.

For example, the moving body is a vehicle capable of automatically traveling without being driven and operated by a person seated in the vehicle. Examples of the vehicle include one that travels fully autonomously, one that autonomously travel while being monitored in a remote location, and one that travels while being operated in a remote location. The moving body may be an autonomously movable robot or an unmanned aerial vehicle, for example. For example, the moving body includes a sensor such as a camera, a thermographic camera, a radar, a light detection and ranging (LiDAR) sensor, a SONAR system, a global positioning system (GPS) and/or an inertial measurement unit (IMU). The movement is controlled using the sensing data obtained by these sensors.

Remote processing server 100 establishes wireless communications with the moving body, and processes the point cloud data obtained by the moving body to control the moving body in a remote location. For example, remote processing server 100 estimates the position of the moving body and detects an obstacle in the vicinity of the moving body, for example, using the point cloud data obtained by the moving body. Remote processing server 100 controls the moving body in a remote location using results of the position estimation and obstacle detection.

The moving body includes information processing device 10 mounted thereon. Information processing device 10 is a computer including a processor, a memory, and a communication interface, for example. The memory includes a read only memory (ROM) and a random-access memory (RAM), each storing the programs to be executed by the processor. Information processing device 10 includes point cloud data obtainer 11, traffic information obtainer 12a, travel condition obtainer 12b, travel task obtainer 12c, monitoring information obtainer 12d, processing information obtainer 12e, travel information obtainer 12f, determiner 13, compressor 14, adder 15, and outputter 16. Each of point cloud data obtainer 11, traffic information obtainer 12a, travel condition obtainer 12b, travel task obtainer 12c, monitoring information obtainer 12d, processing information obtainer 12e, travel information obtainer 12f, determiner 13, compressor 14, adder 15, and outputter 16 is a processor that executes the programs stored in the memory.

Point cloud data obtainer 11 obtains the point cloud data obtained by the sensor such a radar or a LiDAR sensor sensing the vicinity of the moving body. Note that point cloud data obtainer 11 may obtain the point cloud data obtained by a sensor placed on another moving body or a roadside unit, for example, or the point cloud data stored in a point cloud database. The point cloud data is coordinate data on respective points but not limited thereto. For example, the point cloud data may include other data such as the colors of the points. Alternatively, the point cloud data may be polygon or mesh data, for example, obtained by processing the point cloud.

Traffic information obtainer 12a obtains traffic information in the vicinity of the moving body. Details of traffic information obtainer 12a will be described later.

Travel condition obtainer 12b obtains the travel conditions of the moving body. Details of travel condition obtainer 12b will be described later.

Travel task obtainer 12c obtains the travel task of the moving body. Details of travel task obtainer 12c will be described later.

Monitoring information obtainer 12d obtains monitoring information from an observer of the moving body or an object in the vicinity of the moving body. Details of monitoring information obtainer 12d will be described later.

Processing information obtainer 12e obtains the processing information indicating the details or result of the processing for the autonomous driving of the moving body. Details of processing information obtainer 12e will be described later.

Travel information obtainer 12f obtains the travel information on the moving body. Details of travel information obtainer 12f will be described later.

Determiner 13 determines the compression mode for compressing the point cloud data obtained by point cloud data obtainer 11 based on at least one of the traffic information, travel conditions, travel task, monitoring information, processing information, or travel information described above. For example, determiner 13 determines a specific area included in the vicinity of the moving body based on at least one of the traffic information, travel conditions, travel task, or monitoring information described above. Details of determiner 13 will be described later.

Compressor 14 executes the compression control on the point cloud data in the determined compression mode. For example, compressor 14 executes the compression control on first and second point cloud data, which are included in the point cloud data obtained by point cloud data obtainer 11, differently from each other. The point cloud data is associated with the specific area, whereas the second point cloud data is associated with an area other than the specific area. Details of compressor 14 will be described later.

Adder 15 adds additional information on the compression control to compressed data. Details of the additional information will be described later.

Outputter 16 outputs the compressed data obtained by executing the compression control on the point cloud data. For example, outputter 16 outputs the compressed data added with the additional information. For example, outputter 16 transmits the compressed data via a communication interface, for example, included in information processing device 10 to remote processing server 100. Since the point cloud data is compressed into the compressed data, outputter 16 transmits the point cloud data to remote processing server 100 with a low delay. Note that the compressed data may be used in the moving body and outputter 16 may output the compressed data to a constituent element of the moving body for own position estimation or obstacle detection. In this case, the moving body has a lower processing load.

Remote processing server 100 is a computer including a processor, a memory, and a communication interface, for example. The memory includes a ROM and a RAM, for example, each storing the programs to be executed by the processor. Remote processing server 100 includes monitoring information transmitter 101, processing information transmitter 102, and receiver 103. Each of monitoring information transmitter 101, processing information transmitter 102, and receiver 103 is a processor that executes the programs stored in the memory.

Monitoring information transmitter 101 transmits the monitoring information (e.g., information indicating the range monitored by the observer of the moving body) via a communication interface, for example, included in remote processing server 100 to the moving body.

Processing information transmitter 102 transmits the processing information (e.g., the details of the processing for the autonomous driving of the moving body) via a communication interface, for example, included in remote processing server 100 to the moving body. Specifically, processing information transmitter 102 transmits the details of the processing necessary to control the moving body in a remote location (e.g., estimate the position of the moving body and detect an obstacle in the vicinity of the moving body) to the moving body.

Receiver 103 receives the compressed data via a communication interface, for example, included in remote processing server 100 from the moving body. The compressed data received by receiver 103 is used by, for example, remote processing server 100 to estimate the position of the moving body and detect an obstacle in the vicinity of the moving body. The compressed data is eventually used for the autonomous driving of the moving body (e.g., an autonomous driving vehicle). The compressed data received by receiver 103 may be accumulated as a database. Note that processing information transmitter 102 may transmit, to the moving body, the information designating the area or compression rate, for example, of the point cloud necessary to accumulate the point cloud data as the database.

Note that the constituent elements of remote processing server 100 may be distributed into a plurality of servers. For example, there may be a server, other than remote processing server 100, that accumulates the point cloud data as the database. The server may transmit, to the moving body, the information designating the area or compression rate, for example, of the point cloud necessary to accumulate the point cloud data as the database.

Now, Embodiments 1 to 6 will be described as operations of information processing device 10.

Embodiment 1

First, Embodiment 1 will be described with reference to FIGS. 2 and 3.

Figure 2:
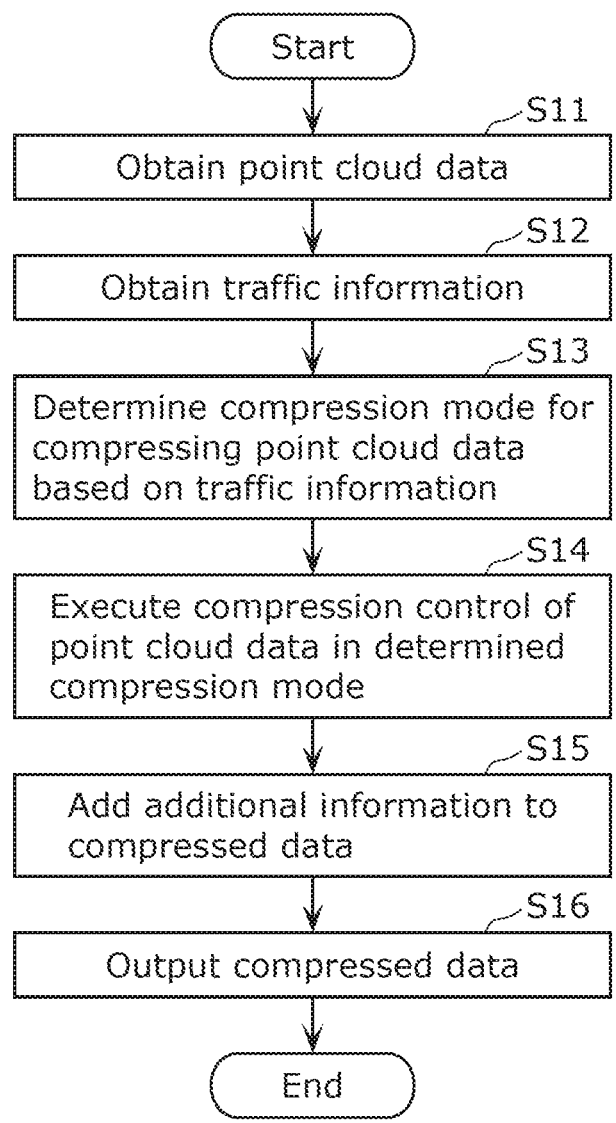
FIG. 2 is a flowchart showing an operation of an information processing device according to Embodiment 1.

FIG. 2 is a flowchart showing an operation of information processing device 10 according to Embodiment 1.

First, point cloud data obtainer 11 obtains the point cloud data obtained by sensing the vicinity of a moving body or stored in a point cloud database (step S11).

Next, traffic information obtainer 12a obtains traffic information in the vicinity of the moving body (step S12). For example, the traffic information includes map information or traffic jam information. For example, traffic information obtainer 12a obtains the map information or traffic jam information from an external server or a car navigation system, for example, mounted on the moving body. For example, the map information includes the road context in the vicinity of the moving body (i.e., the information on objects or signs on a road, the road type such as a roadway or a sidewalk, road surface conditions, or the road shape such as an intersection) or a risk map. For example, the traffic jam information includes the information on a place with vehicles or people at a higher density.

Then, determiner 13 determines the compression mode for compressing the point cloud data based on the traffic information obtained by traffic information obtainer 12a (step S13). For example, determiner 13 determines a specific area included in the vicinity of the moving body based on the traffic information obtained by traffic information obtainer 12a. For example, determining the specific area is an example of determining the compression mode.

After that, compressor 14 executes the compression control on the point cloud data in the determined compression mode (step S14). For example, compressor 14 executes the compression control on first and second point cloud data, which are included in the point cloud data obtained by point cloud data obtainer 11, differently from each other. The first point cloud data is associated with the specific area, whereas the second point cloud data is associated with an area other than the specific area. For example, compressor 14 executes the compression control (i) to compress one of the first and second point cloud data and not compress the other of the first and second point cloud data or (ii) to vary a reduction amount of the point cloud between the first and second point cloud data. For example, executing the compression control on the first and second point cloud data differently from each other is an example of executing the compression control on the point cloud data in the determined compression mode.

Here, specific example operations of determiner 13 and compressor 14 in Embodiment 1 will be described with reference to FIG. 3.

Figure 3:
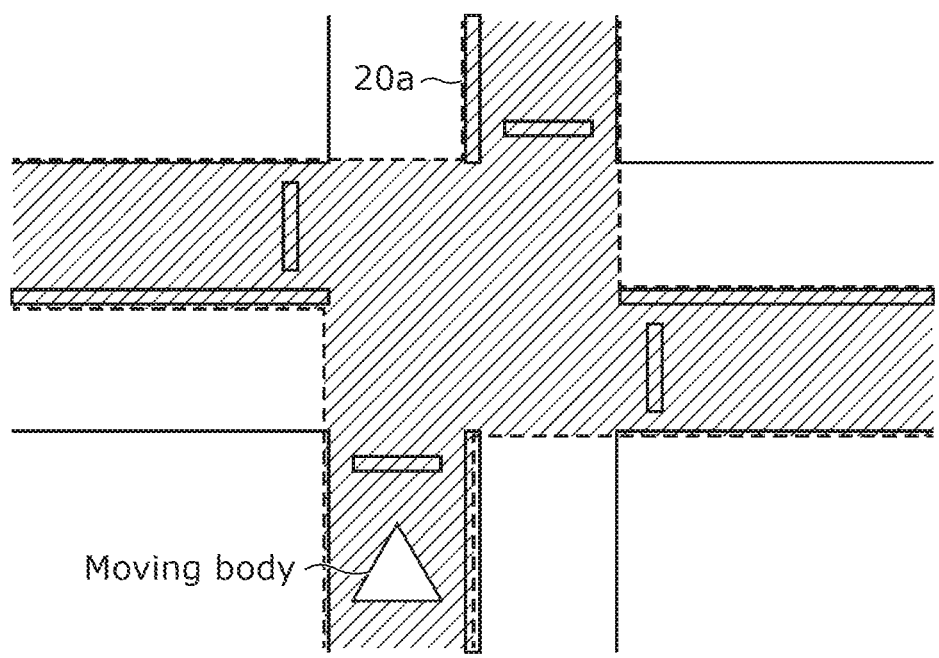
FIG. 3 illustrates an example operation of the information processing device according to Embodiment 1.

FIG. 3 illustrates an example operation of information processing device 10 according to Embodiment 1. Note that FIG. 3 shows an intersection in a country (e.g., Japan) employing the left-side driving.

For example, assume that traffic information obtainer 12a obtains the following information as the traffic information in the vicinity of a moving body (i.e., the object represented by a triangle in FIG. 3) from the map information. The information indicates that the moving body is about to enter the intersection.

Determiner 13 determines area 20a as a specific area included in the vicinity of the moving body based on such the traffic information. Note that the specific area may be designated on a map, or may be designated by a geofence. As the specific area, area 20a has a higher probability of an incident, for example, than the areas other than the specific area. Specifically, area 20a includes an intersection or lanes leading to the intersection. Moving bodies (e.g., vehicles) pass each other at an intersection which is thus an area with a higher probability of an incident. The lanes leading to the intersection allow vehicles to enter such an intersection and thus have a higher probability of an incident.

Compressor 14 executes the compression control on the first and second point cloud data differently from each other. The first point cloud data is associated with area 20a that is a specific area, whereas the second point cloud data is associated with the areas (e.g., the lanes after vehicles pass through the intersection and the areas outside the road) other than area 20a. Specifically, compressor 14 compresses no point cloud of the first point cloud data, but compresses (e.g., deletes) the point cloud of the second point cloud data. Alternatively, compressor 14 reduces the point cloud of the second point cloud data by a larger amount than the point cloud of the first point cloud data. That is, compressor 14 deletes no point cloud or reduces the point cloud by a smaller amount with respect to the first point cloud data associated with the specific area with a higher probability of an incident. On the other hand, compressor 14 deletes or reduces the point cloud by a larger amount with respect to the second point cloud data associated with an area, other than the specific area, with a lower probability of an incident. Note that deleting no point cloud or reducing the point cloud by a smaller amount will also be referred to as compression "at a lower compression rate", whereas deleting the point cloud or reducing the point cloud by a larger amount will also be referred to as compression "at a higher compression rate". For example, the first point cloud data is used for obstacle detection to reduce collisions or other accidents and is thus compressed at a lower compression rate. For example, the second point cloud data is used to estimate the position of the moving body, for example, requires no high-density point cloud, and is thus compressed at a higher compression rate.

Note that determiner 13 may determine an area with a traffic jam, as a specific area included in the vicinity of the moving body based on the traffic information (e.g., traffic jam information).

In this case, compressor 14 executes the compression control on the first and second point cloud data differently from each other. The first point cloud data is associated with the area with the traffic jam, whereas the second point cloud data is associated with the area other than the area with the traffic jam. Specifically, compressor 14 compresses no point cloud of the first point cloud data, but compresses (e.g., deletes) the point cloud of the second point cloud data. Alternatively, compressor 14 reduces the point cloud of the second point cloud data by a larger amount than the point cloud of the first point cloud data. That is, compressor 14 deletes no point cloud or reduces the point cloud by a smaller amount with respect to the first point cloud data associated with the specific area that is the area with the traffic jam. On the other hand, compressor 14 deletes or reduces the point cloud by a larger amount with respect to the second point cloud data associated with the area other than the specific area. For example, the first point cloud data is used for obstacle detection to reduce collisions with a lot of obstacles in the traffic jam, for example, and is thus compressed at a lower compression rate. For example, the second point cloud data is used to estimate the position of the moving body, for example, requires no high-density point cloud, and is thus compressed at a higher compression rate.

Adder 15 adds additional information to the compressed data obtained by executing the compression control on the point cloud data (step S15). For example, adder 15 adds the information indicating that the point cloud associated with which area has been deleted or reduced by a larger amount, as the additional information to the compressed data. This allows the operator to recognize that the point cloud data associated with which area has been processed when handling the compressed data.

Then, outputter 16 outputs the compressed data (e.g., the compressed data added with the additional information)(step S16).

As described above, the point cloud is deleted or reduced in the following manner based on the traffic information in the vicinity of the moving body. The point cloud is not deleted or reduced by a smaller amount in a certain area (e.g., a specific area) included in the vicinity of the moving body. The point cloud is deleted or reduced by a larger amount in another area (e.g., an area other than the specific area) included in the vicinity of the moving body. That is, the compression of the point cloud data suitable for the travel of the moving body is possible based on the traffic information in the vicinity of the moving body.

In Embodiment 1, information processing device 10 may include none of travel condition obtainer 12b, travel task obtainer 12c, monitoring information obtainer 12d, processing information obtainer 12e, and travel information obtainer 12f.

Embodiment 2

Now, Embodiment 2 will be described with reference to FIGS. 4 to 6.

Figure 4:
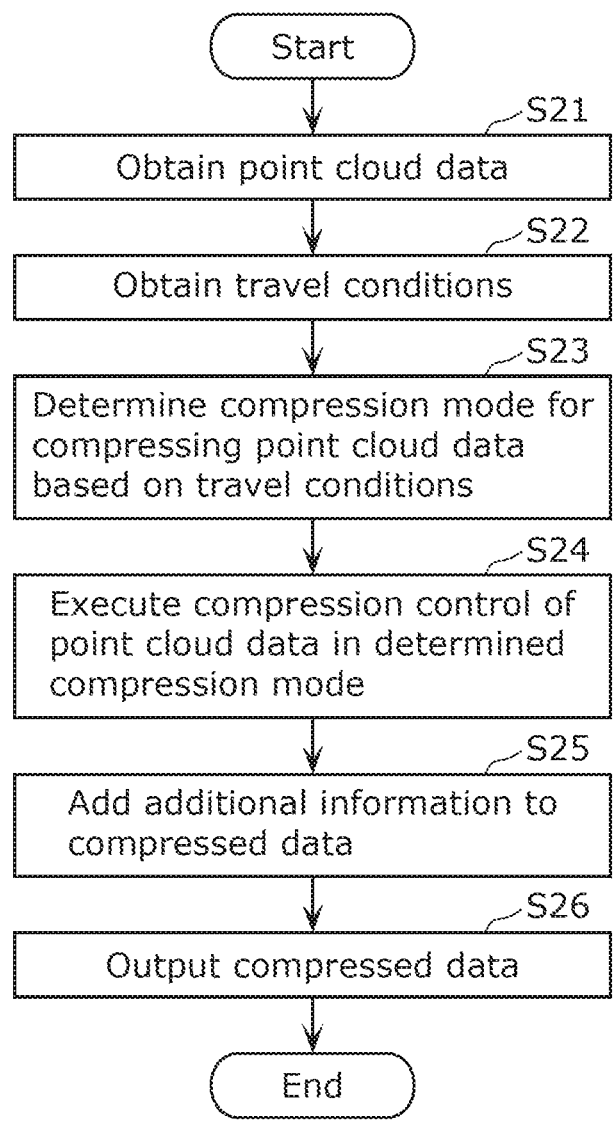
FIG. 4 is a flowchart showing an operation of an information processing device according to Embodiment 2.

FIG. 4 is a flowchart showing an operation of information processing device 10 according to Embodiment 2.

First, point cloud data obtainer 11 obtains the point cloud data obtained by sensing the vicinity of a moving body or stored in a point cloud database (step S21).

Next, travel condition obtainer 12b obtains the travel conditions of the moving body (step S22). For example, the travel conditions include the speed, steering angle, or accuracy in estimating the own position of the moving body. For example, the travel conditions include the type of the driver of the moving body. For example, travel condition obtainer 12b obtains the speed, steering angle, accuracy in estimating the own position, or driver of the moving body from various electronic control units (ECU) included in the moving body.

Then, determiner 13 determines the compression mode for compressing the point cloud data based on the travel conditions obtained by travel condition obtainer 12b (step S23). For example, determiner 13 determines a specific area included in the vicinity of the moving body based on the travel conditions obtained by travel condition obtainer 12b. For example, determining the specific area is an example of determining the compression mode.

After that, compressor 14 executes the compression control on the point cloud data in the determined compression mode (step S24). For example, compressor 14 executes the compression control on the first and second point cloud data, which are included in the point cloud data obtained by point cloud data obtainer 11, differently from each other. The first point cloud data is associated with the specific area, whereas the second point cloud data is associated with an area other than the specific area. For example, compressor 14 executes the compression control (i) to compress one of the first and second point cloud data and not compress the other of the first and second point cloud data or (ii) to vary a reduction amount of the point cloud between the first and second point cloud data. For example, executing the compression control on the first and second point cloud data differently from each other is an example of executing the compression control on the point cloud data in the determined compression mode.

Here, specific example operations of determiner 13 and compressor 14 in Embodiment 2 will be described with reference to FIG. 5.

Figure 5:
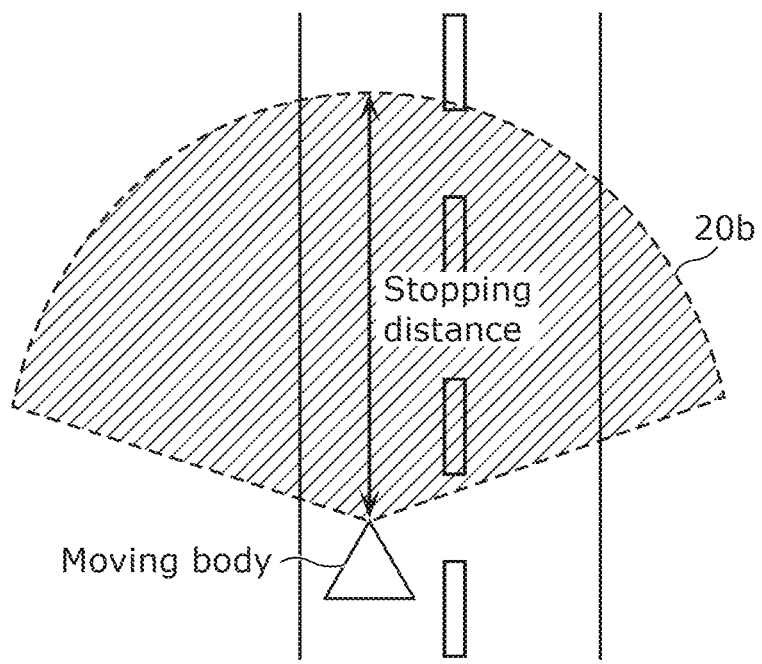
FIG. 5 illustrates an example operation of the information processing device according to Embodiment 2.

FIG. 5 illustrates an example operation of information processing device 10 according to Embodiment 2. Note that FIG. 5 shows a two-lane road in a country (e.g., Japan) employing the left-side driving.

For example, assume that travel condition obtainer 12b obtains, as the travel conditions of a moving body (i.e., the object represented by a triangle in FIG. 5), the speed and steering angle of the moving body.

Determiner 13 determines area 20b as a specific area included in the vicinity of the moving body based on such the travel conditions. Note that the specific area may be designated on a map, or may be designated by a geofence. As the specific area, area 20b is within a stoppable distance in which the traveling moving body can stop, for example. For example, determiner 13 determines area 20b based on the speed of the moving body, the travel direction of the moving body according to the steering angle of the moving body, the deceleration of the moving body, and a system delay. Note that area 20b is a circular sector, since the moving body may deviate from the current travel direction.

Compressor 14 executes the compression control on the first and second point cloud data differently from each other. The first point cloud data is associated with area 20b that is a specific area, whereas the second point cloud data is associated with the area (e.g., the area never entered by the traveling moving body) other than area 20*b*. Specifically, compressor 14 compresses no point cloud of the first point cloud data, but compresses (e.g., deletes) the point cloud of the second point cloud data. Alternatively, compressor 14 reduces the point cloud of the second point cloud data by a larger amount than the point cloud of the first point cloud data. That is, compressor 14 deletes no point cloud or reduces the point cloud by a smaller amount with respect to the first point cloud data associated with the specific area within a stopping distance of the moving body. On the other hand, compressor 14 deletes or reduces the point cloud by a larger amount with respect to the second point cloud data associated with the area, other than the specific area, never entered by the moving body. For example, the first point cloud data is used for obstacle detection to reduce collisions or other accidents and is thus compressed at a lower compression rate. For example, the second point cloud data is used to estimate the position of the moving body, for example, requires no high-density point cloud, and is thus compressed at a higher compression rate.

Other specific example operations of determiner 13 and compressor 14 in Embodiment 2 will be described with reference to FIG. 6.

Figures 6, 7:
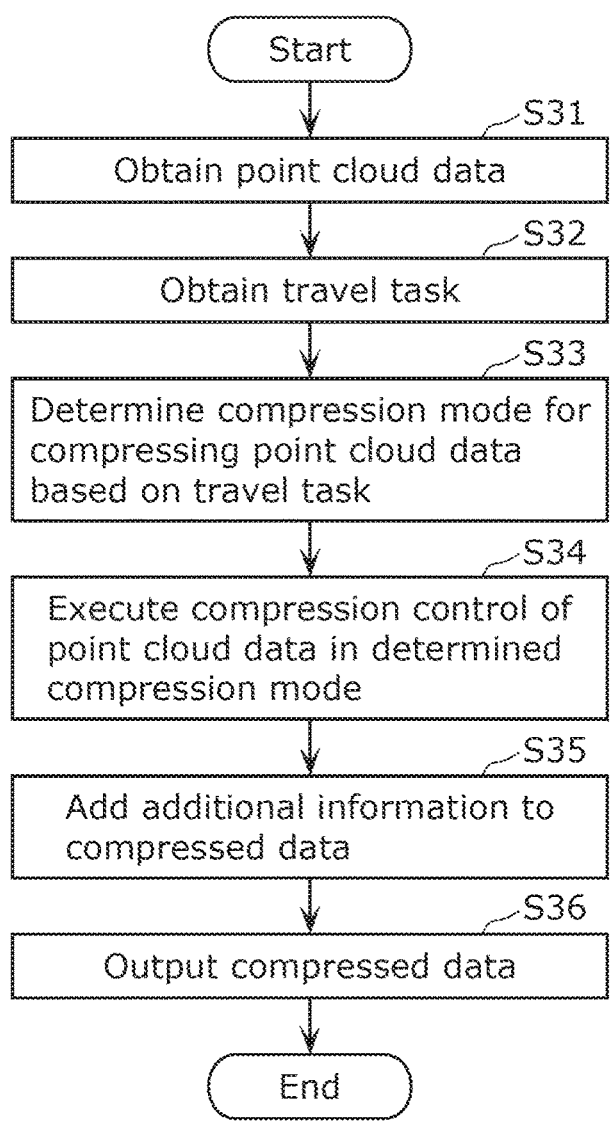
FIG. 6 illustrates another example operation of the information processing device according to Embodiment 2.
FIG. 7 is a flowchart showing an operation of an information processing device according to Embodiment 3.

FIG. 6 illustrates another example operation of information processing device 10 according to Embodiment 2.

For example, assume that travel condition obtainer 12*b* obtains, as the travel conditions of the moving body, the information on the driver of the moving body. For example, if the travel mode of the moving body is a fully autonomous mode, the driver of the moving body is the moving body itself. If the travel mode of the moving body is a remote monitoring mode, the driver of the moving body is a moving body with a remote monitoring function. If the travel mode of the moving body is a remote operation mode, the driver of the moving body is a remote operator.

Determiner 13 determines the compression mode for compressing the point cloud data based on such the travel conditions. For example, if the travel mode of the moving body is the fully autonomous mode (i.e., the moving body is the driver), determiner 13 sets a downsampling voxel size of 2 m as the compression rate of the point cloud data. For example, if the travel mode of the moving body is the remote monitoring mode (i.e., the moving body with the remote monitoring function is the driver), determiner 13 sets a downsampling voxel size of 1 m as the compression rate of the point cloud data. For example, if the travel mode of the moving body is the remote operation mode (i.e., the remote observer is the driver), determiner 13 sets a downsampling voxel size of 0.5 m as the compression rate of the point cloud data.

Compressor 14 executes the compression control on the point cloud data in the determined compression mode. For example, if the travel mode of the moving body is the fully autonomous mode, compressor 14 executes the compression control on the point cloud data in the compression mode with the downsampling voxel size of 2 m. For example, if the moving body is in the fully autonomous mode, remote processing server 100 basically controls no movement of the moving body, which requires no high-density point cloud and thus a higher compression rate. For example, if the travel mode of the moving body is the remote monitoring mode, compressor 14 executes the compression control on the point cloud data in the compression mode with the downsampling voxel size of 1 m. For example, if the moving body is in the remote monitoring mode, remote processing server 100 controls the movement (e.g., sudden braking) of the moving body in an emergency, which requires relatively high-density point cloud data and thus a relatively lower compression rate. For example, if the travel mode of the moving body is the remote operation mode, compressor 14 executes the compression control on the point cloud data in the compression mode with the downsampling voxel size of 0.5 m. For example, if the moving body is in the remote operation mode, remote processing server 100 (e.g., a remote observer that manages remote processing server 100) controls the movement of the moving body in a remote location, which requires a high-density point cloud and thus a lower compression rate.

Adder 15 adds additional information to the compressed data obtained by executing the compression control on the point cloud data (step S25). For example, adder 15 adds the information indicating that the point cloud associated with which area has been deleted or reduced by a larger amount, as the additional information to the compressed data. This allows the operator to recognize that the point cloud data associated with which area has been processed, when handling the compressed data. For example, adder 15 adds the information indicating how much the compression rate of the point cloud data was, as the additional information to the compressed data. This allows the operator to recognize how much the point cloud data has been compressed and processed, when handling the compressed data.

Then, outputter 16 outputs the compressed data (e.g., the compressed data added with the additional information)(step S26).

As described above, the point cloud is deleted or reduced in the following manner based on the travel conditions of the moving body. The point cloud is not deleted or reduced by a smaller amount in a certain area (e.g., a specific area) included in the vicinity of the moving body. The point cloud is deleted or reduced by a larger amount in another area (e.g., an area other than the specific area) included in the vicinity of the moving body. That is, the compression of the point cloud data suitable for the travel of the moving body is possible based on the travel conditions of the moving body.

In Embodiment 2, information processing device 10 may include none of traffic information obtainer 12*a*, travel task obtainer 12*c*, monitoring information obtainer 12*d*, processing information obtainer 12*e*, and travel information obtainer 12*f*.

Embodiment 3

Now, Embodiment 3 will be described with reference to FIGS. 7 and 8.

FIG. 7 is a flowchart showing an operation of information processing device 10 according to Embodiment 3.

First, point cloud data obtainer 11 obtains the point cloud data obtained by sensing the vicinity of a moving body or stored in a point cloud database (step S31).

Next, travel task obtainer 12*c* obtains the travel task of the moving body (step S32). For example, the travel task includes the task of the moving body, such as turning right or left, changing lanes, or acceleration or deceleration. For example, travel task obtainer 12*c* obtains the task of moving body, such as turning right or left, changing lanes, or acceleration or deceleration from various ECUs or other units included in the moving body.

Then, determiner 13 determines the compression mode for compressing the point cloud data based on the travel task obtained by travel task obtainer 12*c* (step S33). For example, determiner 13 determines a specific area included in the vicinity of the moving body based on the travel task obtained by travel task obtainer 12c. For example, determining the specific area is an example of determining the compression mode.

After that, compressor 14 executes the compression control on the point cloud data in the determined compression mode (step S34). For example, compressor 14 executes the compression control on first and second point cloud data, which are included in the point cloud data obtained by point cloud data obtainer 11, differently from each other. The first point cloud data is associated with the specific area, and the second point cloud data is associated with an area other than the specific area. For example, compressor 14 executes the compression control (i) to compress one of the first and second point cloud data and not compress the other of the first and second point cloud data or (ii) to vary a reduction amount of the point cloud between the first and second point cloud data. For example, executing the compression control on the first and second point cloud data differently from each other is an example of executing the compression control on the point cloud data in the determined compression mode.

Here, specific example operations of determiner 13 and compressor 14 in Embodiment 3 will be described with reference to FIG. 8.

Figure 8:
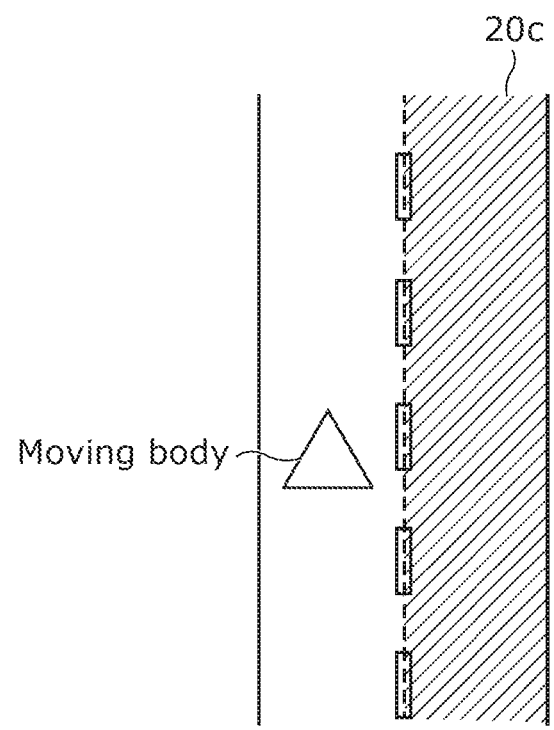
FIG. 8 illustrates an example operation of the information processing device according to Embodiment 3.

FIG. 8 illustrates an example operation of information processing device 10 according to Embodiment 3. Note that FIG. 8 shows a two-lane road in a country (e.g., Japan) employing the left-side driving.

For example, assume that travel task obtainer 12c obtains, as a travel task of a moving body (i.e., the object represented by a triangle in FIG. 8), the information indicating that the moving body is about to change lanes to a passing lane.

Determiner 13 determines area 20c as a specific area included in the vicinity of the moving body based on such the travel task. Note that the specific area may be designated on a map, or may be designated by a geofence. As the specific area, area 20c is, for example, traveled by the moving body while executing the travel task, and specifically, a passing lane in this embodiment.

Compressor 14 executes the compression control on first and second point cloud data differently from each other. The first point cloud data is associated with area 20c that is a specific area, whereas the second point cloud data is associated with an area (e.g., the lane being traveled by the moving body now) other than area 20c. Specifically, compressor 14 compresses no point cloud of the first point cloud data, but compresses (e.g., deletes) the point cloud of the second point cloud data. Alternatively, compressor 14 reduces the point cloud of the second point cloud data by a larger amount than the point cloud of the first point cloud data. That is, compressor 14 deletes no point cloud or reduces the point cloud by a smaller amount with respect to the first point cloud data associated with the specific area traveled by the moving body while executing the travel task. On the other hand, compressor 14 deletes or reduces the point cloud by a larger amount with respect to the second point cloud data associated with the area other than the specific area. For example, the first point cloud data is used for obstacle detection to reduce collisions or other accidents and is thus compressed at a lower compression rate. For example, the second point cloud data is used to estimate the position of the moving body, for example, requires no high-density point cloud, and is thus compressed at a higher compression rate.

Assume that travel task obtainer 12c obtains the information indicating that the moving object is, as a travel task, about to accelerate or decelerate into a specific speed as instructed. In this case, the specific area may be determined in accordance with the speed as instructed. For example, being instructed to travel at a lower speed, the moving body can stop in a shorter distance. A small specific area may be determined in front of the moving body.

Assume that travel task obtainer 12c obtains, as a travel task, a task with higher emergency such as sudden braking, which requires grasping of the detailed state in the vicinity of the moving body. An area included in the vicinity of the moving body may be determined as a specific area. That is, the point cloud may be compressed at a lower compression rate in the area included in the vicinity of the moving body.

Adder 15 adds additional information to the compressed data obtained by executing the compression control on the point cloud data (step S35). For example, adder 15 adds the information indicating that the point cloud associated with which area has been deleted or reduced by a larger amount, as the additional information to the compressed data. This allows the operator to recognize that the point cloud data associated with which area has been processed, when handling the compressed data.

Then, outputter 16 outputs the compressed data (e.g., the compressed data added with the additional information)(step S36).

As described above, the point cloud is deleted or reduced in the following manner based on the travel task of the moving body. The point cloud is not deleted or reduced by a smaller amount in a certain area (e.g., a specific area) included in the vicinity of the moving body. The point cloud is deleted or reduced by a larger amount in another area (e.g., an area other than the specific area) included in the vicinity of the moving body. That is, the compression of the point cloud data suitable for the travel of the moving body is possible based on the travel task of the moving body.

In Embodiment 3, information processing device 10 may include none of traffic information obtainer 12a, travel condition obtainer 12b, monitoring information obtainer 12d, processing information obtainer 12e, and travel information obtainer 12f.

Embodiment 4

Now, Embodiment 4 will be described with reference to FIGS. 9 and 10.

Figure 9:
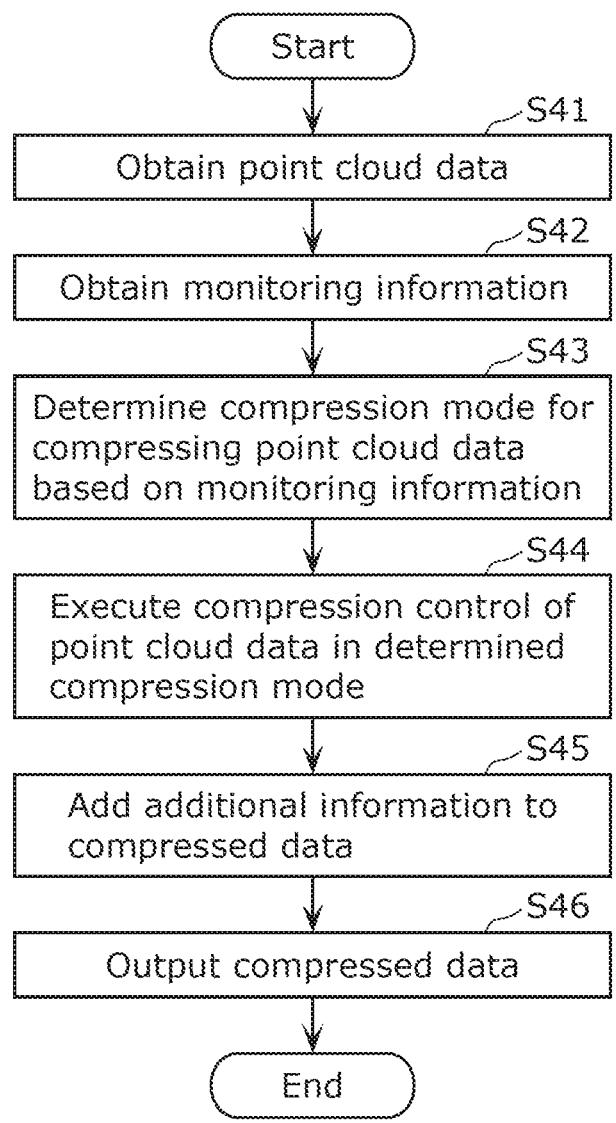
FIG. 9 is a flowchart showing an operation of an information processing device according to Embodiment 4.

FIG. 9 is a flowchart showing an operation of information processing device 10 according to Embodiment 4.

First, point cloud data obtainer 11 obtains the point cloud data obtained by sensing the vicinity of a moving body or stored in a point cloud database (step S41).

Next, monitoring information obtainer 12d obtains monitoring information from an observer of the moving body or an object in the vicinity of the moving body (step S42). The object in the vicinity of the moving body is a vehicle traveling in the vicinity of the moving body or a roadside unit, for example. For example, the monitoring information includes the information indicating the range monitored by the observer of the moving body, or the information indicating the range monitored by the object. For example, the range monitored by the observer is the range sensed by a sensor mounted on the moving body. The observer performs the monitoring through the sensor mounted on the moving body. For example, the range monitored by the object is the range sensed by a sensor mounted on the object. For example, monitoring information obtainer 12d obtains the information indicating the range monitored by the observer of the moving body via a communication interface, for example, included in information processing device 10 from an external server (e.g., remote processing server 100). For example, monitoring information obtainer 12d obtains the information indicating the range monitored by the object via a communication interface, for example, included in information processing device 10 from the object. Note that monitoring information obtainer 12d may obtain the information indicating the range monitored by the object via a communication interface, for example, included in information processing device 10 from an external server.

Then, determiner 13 determines the compression mode for compressing the point cloud data based on the monitoring information obtained by monitoring information obtainer 12d (step S43). For example, determiner 13 determines a specific area included in the vicinity of the moving body based on the monitoring information obtained by monitoring information obtainer 12d. For example, determining the specific area is an example of determining the compression mode.

After that, compressor 14 executes the compression control on the point cloud data in the determined compression mode (step S44). For example, compressor 14 executes the compression control on first and second point cloud data, which are included in the point cloud data obtained by point cloud data obtainer 11, differently from each other. The first point cloud data is associated with the specific area, whereas the second point cloud data is associated with an area other than the specific area. For example, compressor 14 executes the compression control (i) to compress one of the first and second point cloud data and not compress the other of the first and second point cloud data or (ii) to vary a reduction amount of the point cloud between the first and second point cloud data. For example, executing the compression control on the first and second point cloud data differently from each other is an example of executing the compression control on the point cloud data in the determined compression mode.

Here, specific example operations of determiner 13 and compressor 14 in Embodiment 4 will be described with reference to FIG. 10.

Figure 10:
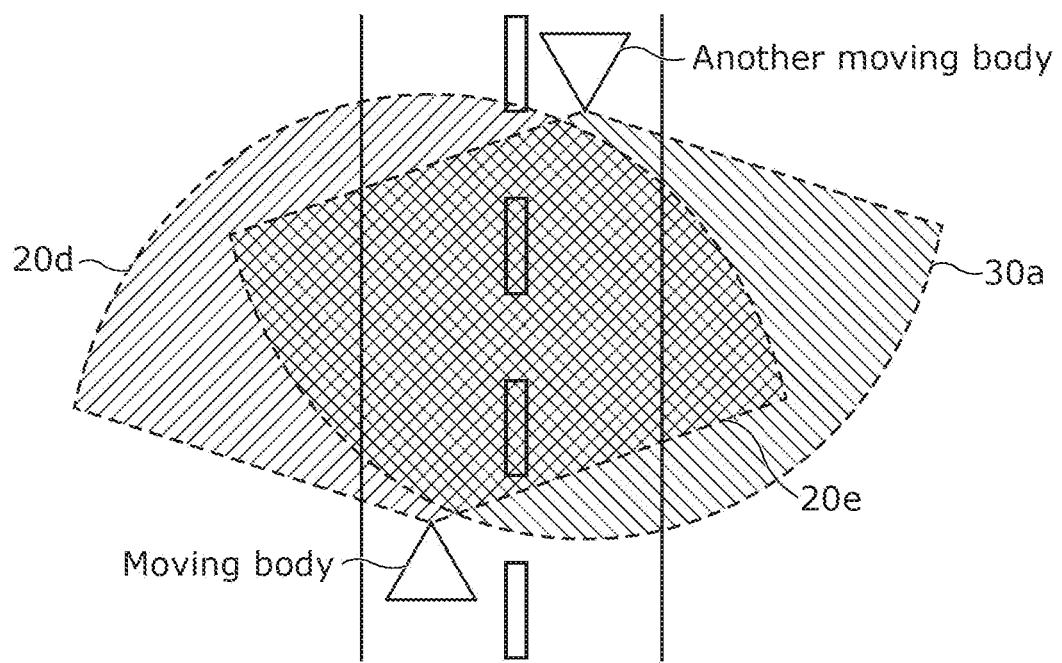
FIG. 10 illustrates an example operation of the information processing device according to Embodiment 4.

FIG. 10 illustrates an example operation of information processing device 10 according to Embodiment 4. Note that FIG. 10 shows a two-lane road in a country (e.g., Japan) employing the left-side driving.

For example, assume that monitoring information obtainer 12d obtains area 20d as a range monitored by an observer of a moving body (i.e., the object represented by a triangle on the lower left of FIG. 10). Monitoring information obtainer 12d also obtains area 30a as a range monitored by an object in the vicinity of the moving body (e.g., another moving body traveling on the opposite lane and the object represented by a triangle on the upper right of FIG. 10).

Determiner 13 determines area 20e as a specific area included in the vicinity of the moving body based on such the monitoring information. Note that the specific area may be designated on a map, or may be designated by a geofence. As the specific area, area 20e is, for example, an overlap between the range (i.e., area 20d) monitored by the observer and the range (i.e., area 30a) monitored by the object. Note that the moving body itself may calculate area 20e based on area 20d and area 30a or may be notified of area 20e by remote processing server 100.

Compressor 14 executes the compression control on first and second point cloud data differently from each other. The first point cloud data is associated with area 20e that is a specific area, whereas the second point cloud data is associated with an area other than area 20e. Specifically, compressor 14 compresses (e.g., deletes) the point cloud of the first point cloud data, and compresses no point cloud with respect to the second point cloud data. Alternatively, compressor 14 reduces the point cloud of the first point cloud data by a larger amount than the point cloud of the second point cloud data. That is, compressor 14 deletes or reduces the point cloud by a larger amount with respect to the first point cloud data associated with a specific area that is the overlap between the range monitored by the observer and the range monitored by the object. On the other hand, compressor 14 deletes no point cloud or reduces the point cloud by a smaller amount with respect to the second point cloud data associated with the area other than the specific area. For example, the point cloud data in the specific area is obtained by integrating the point cloud data (i.e., the first point cloud data) obtained by the moving body and the point cloud data obtained by another moving body to have a sufficient density. The first point cloud data is thus compressed at a higher compression rate. For example, the second point cloud data is associated with an area not overlapping the range monitored by any other moving body, and is thus compressed at a lower compression rate.

Note that determiner 13 may determine area 20d as a specific area included in the vicinity of the moving body based on the monitoring information. In this case, area 20d as the specific area is, for example, the range monitored by the observer.

In this case, compressor 14 executes the compression control on first and second point cloud data differently from each other. The first point cloud data is associated with area 20d that is a specific area, whereas the second point cloud data is associated with an area other than area 20d. Specifically, compressor 14 compresses no point cloud of the first point cloud data, but compresses (e.g., deletes) the point cloud of the second point cloud data. Alternatively, compressor 14 reduces the point cloud of the second point cloud data by a larger amount than the point cloud of the first point cloud data. That is, compressor 14 deletes no point cloud or reduces the point cloud by a smaller amount with respect to the first point cloud data associated with a specific area that is the range monitored by the observer. On the other hand, compressor 14 deletes or reduces the point cloud by a larger amount with respect to the second point cloud data associated with the area other than the specific area. For example, the first point cloud data is used for monitoring by an observer, and is thus compressed at a lower compression rate. For example, the second point cloud data is not used for monitoring by any observer, and is thus compressed at a higher compression rate.

Adder 15 adds additional information to the compressed data obtained by executing the compression control on the point cloud data (step S45). For example, adder 15 adds the information indicating that the point cloud associated with which area has been deleted or reduced by a larger amount, as the additional information to the compressed data. This allows the operator to recognize that the point cloud data associated with which area has been processed, when handling the compressed data. For example, adder 15 adds the information indicating how much the compression rate of the point cloud data was, as the additional information to the compressed data. This allows the operator to recognize how much the point cloud data has been compressed and processed, when handling the compressed data.

Then, outputter 16 outputs the compressed data (e.g., the compressed data added with the additional information)(step S46).

As described above, the point cloud is deleted or reduced in the following manner based on the monitoring information. The point cloud is not deleted or reduced by a smaller amount in a certain area (e.g., a specific area) included in the vicinity of the moving body. The point cloud is deleted or reduced by a larger amount in another area (e.g., an area other than the specific area) included in the vicinity of the moving body. That is, the compression of the point cloud data suitable for the travel of the moving body is possible based on the monitoring information.

In Embodiment 4, information processing device 10 may include none of traffic information obtainer 12a, travel condition obtainer 12b, travel task obtainer 12c, processing information obtainer 12e, and travel information obtainer 12f.

Embodiment 5

Now, Embodiment 5 will be described with reference to FIGS. 11 to 13.

Figure 11:
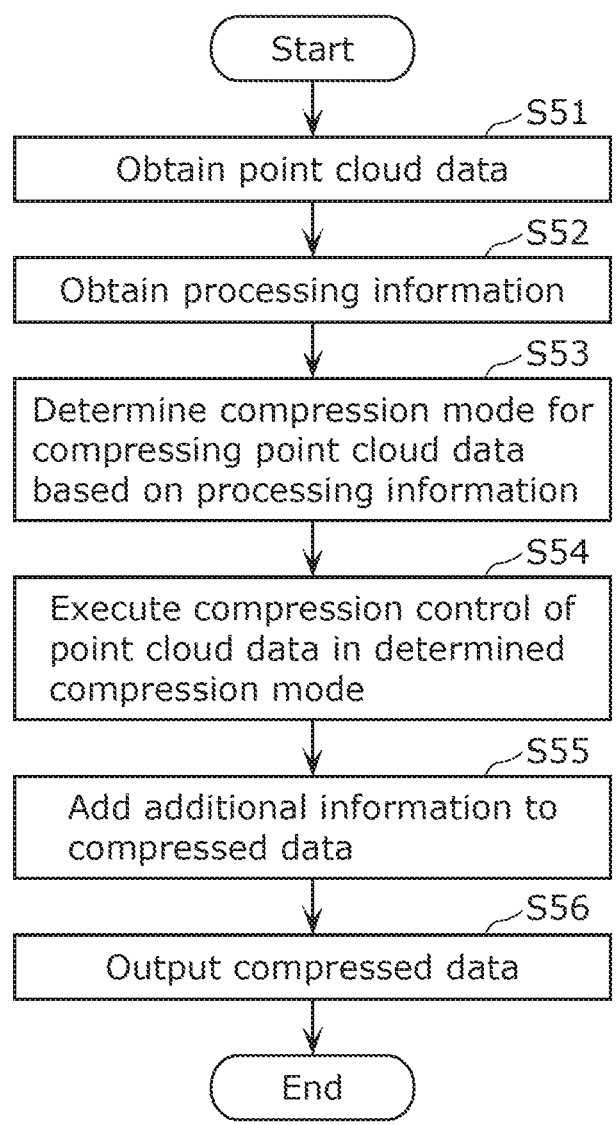
FIG. 11 is a flowchart showing an operation of an information processing device according to Embodiment 5.

FIG. 11 is a flowchart showing an operation of information processing device 10 according to Embodiment 5.

First, point cloud data obtainer 11 obtains the point cloud data obtained by sensing the vicinity of a moving body or stored in a point cloud database (step S51).

Next, processing information obtainer 12e obtains the processing information indicating the details or result of the processing for the autonomous driving of the moving body (step S52). For example, processing information obtainer 12e obtains the details of the processing for the autonomous driving of the moving body via a communication interface, for example, included in information processing device 10 from an external server (e.g., remote processing server 100). For example, processing information obtainer 12e obtains a result of the processing for the autonomous driving of the moving body from a processor (not shown) for the processing included in the moving body.

Then, determiner 13 determines the compression mode for compressing the point cloud data based on the processing information obtained by processing information obtainer 12e (step S53).

After that, compressor 14 executes the compression control on the point cloud data in the determined compression mode (step S54).

Here, specific example operations of determiner 13 and compressor 14 in Embodiment 5 will be described with reference to FIG. 12.

FIG. 12 illustrates an example operation of information processing device 10 according to Embodiment 5.

For example, assume that processing information obtainer 12e obtains, as the processing information, the details of the processing (e.g., the own position estimation or obstacle detection) for the autonomous driving of the moving body from remote processing server 100. That is, remote processing server 100 is about to perform the own position estimation or the obstacle detection for the autonomous driving of the moving body.

Determiner 13 determines a compression mode for compressing the point cloud data based on such the processing information. For example, if the processing for the autonomous driving of the moving body is the own position estimation, determiner 13 sets a downsampling voxel size of 2 m as the compression rate of the point cloud data. For example, if the processing for the autonomous driving of the moving body is the obstacle detection, determiner 13 sets a downsampling voxel size of 1 m as the compression rate of the point cloud data.

Compressor 14 executes the compression control on the point cloud data in the determined compression mode. For example, if the processing for the autonomous driving of the moving body is the own position estimation, compressor 14 executes the compression control on the point cloud data in a compression mode with the downsampling voxel size of 2 m. The own position estimation requires no high-density point cloud and thus a higher compression rate. For example, if the processing for the autonomous driving of the moving body is the obstacle detection, compressor 14 executes the compression control on the point cloud data in a compression mode with the downsampling voxel size of 1 m. The obstacle detection requires a high-density point cloud and thus a lower compression rate.

If the processing for the autonomous driving of the moving body is the obstacle detection, compressor 14 may compress no point cloud or reduces the point cloud on the road by a smaller amount, or may compress or reduces the point cloud other than the point cloud on the road by a larger amount.

The processing information may include the information indicating how to perform the compression (e.g., instruction on the compression rate or instruction on an area with a compression rate to be decreased (or increased)). In this case, determiner 13 may determine the compression mode (e.g., the compression rate or the specific area) based on such the processing information. Compressor 14 may execute the compression control on the point cloud data in the determined compression mode.

Now, other specific example operations of determiner 13 and compressor 14 in Embodiment 5 will be described with reference to FIG. 13.

FIG. 13 illustrates another example operation of information processing device 10 according to Embodiment 5.

For example, assume that processing information obtainer 12e obtains, as the processing information, a result of the processing (e.g., a result of obstacle detection) for the autonomous driving of the moving body.

Determiner 13 determines a compression mode for compressing the point cloud data based on such the processing information. For example, if a smaller number of obstacles are detected as a result of the processing for the autonomous driving of the moving body, determiner 13 sets a downsampling voxel size of 2 m as the compression rate of the point cloud data. For example, if a larger number of obstacles are detected as a result of the processing for the autonomous driving of the moving body, determiner 13 sets a downsampling voxel size of 1 m as the compression rate of the point cloud data.

Compressor 14 executes the compression control on the point cloud data in the determined compression mode. For example, if a smaller number of obstacles are detected as a result of the processing for the autonomous driving of the moving body, compressor 14 executes the compression control on the point cloud data in a compression mode with the downsampling voxel size of 2 m. A smaller number of obstacles require no high-density point cloud and thus a higher compression rate. For example, if a larger number of obstacles are detected as a result of the processing for the autonomous driving of the moving body, compressor 14 executes the compression control on the point cloud data in a compression mode with the downsampling voxel size of 1 m. A larger number of obstacles require a high-density point cloud so as to be detected and thus a lower compression rate.

Adder 15 adds additional information to the compressed data obtained by executing the compression control on the point cloud data (step S55). For example, adder 15 adds the information indicating how much the compression rate of the point cloud data was, as the additional information to the compressed data. This allows the operator to recognize how much the point cloud data has been compressed and processed, when handling the compressed data.

Then, outputter 16 outputs the compressed data (e.g., the compressed data added with the additional information)(step S56).

As described above, the compression of the point cloud data suitable for the travel of the moving body is possible based on the processing information on the moving body.

In Embodiment 5, information processing device 10 may include none of traffic information obtainer 12a, travel condition obtainer 12b, travel task obtainer 12c, monitoring information obtainer 12d, and travel information obtainer 12f.

Embodiment 6

Now, Embodiment 6 will be described with reference to FIGS. 14 and 15.

Figures 14, 15:
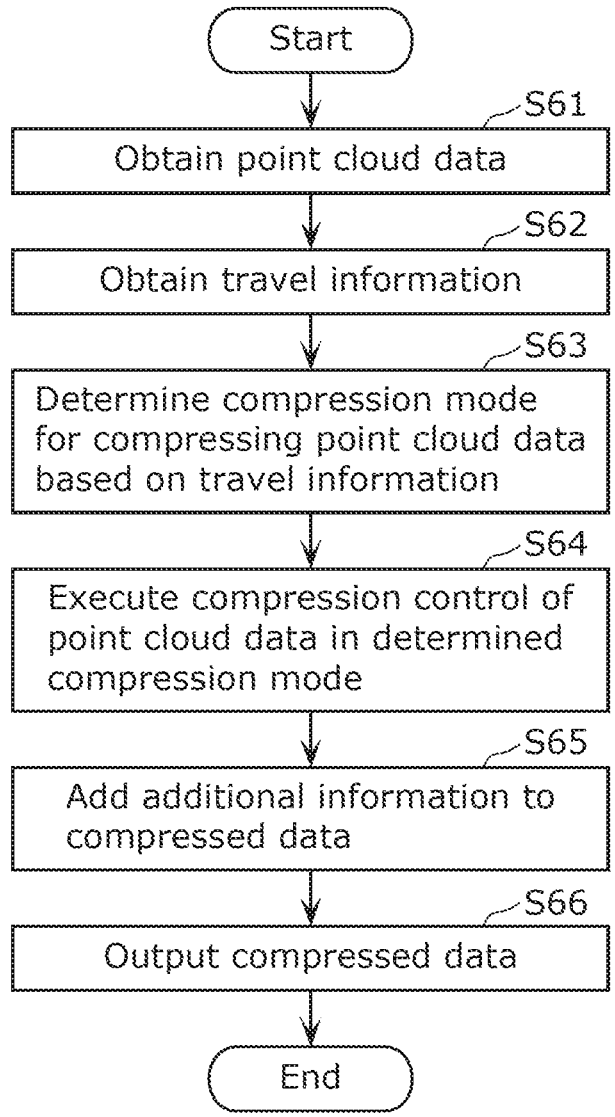
FIG. 14 is a flowchart showing an operation of an information processing device according to Embodiment 6.
FIG. 15 illustrates an example operation of the information processing device according to Embodiment 6.

FIG. 14 is a flowchart showing an operation of information processing device 10 according to Embodiment 6.

First, point cloud data obtainer 11 obtains the point cloud data obtained by sensing the vicinity of a moving body or stored in a point cloud database (step S61).

Next, travel information obtainer 12f obtains the travel information on the moving body (step S62). For example, travel information obtainer 12f obtains the travel information on the moving body from various ECUs or other units included in the moving body. For example, the travel information includes a travel schedule of the moving body. For example, if a moving body is a vehicle that transports passengers, the travel information includes a travel status such as parking, allowing passengers to get on and off, and transporting passengers.

Next, determiner 13 determines the compression mode for compressing the point cloud data based on the travel information obtained by travel information obtainer 12f (step S63).

Next, compressor 14 executes the compression control on the point cloud data in the determined compression mode (step S64).

Here, specific example operations of determiner 13 and compressor 14 in Embodiment 6 will be described with reference to FIG. 15.

FIG. 15 illustrates an example operation of information processing device 10 according to Embodiment 6.

For example, assume that travel information obtainer 12f obtains, as the travel information, the travel schedule of the moving body (e.g., whether the moving body is now travelling or not).

Determiner 13 determines the compression mode for compressing the point cloud data based on such the travel information. For example, if the moving body travelling now, determiner 13 sets a downsampling voxel size of 0.5 m as the compression rate of the point cloud data. For example, if the moving body is not traveling now, determiner 13 sets a downsampling voxel size of 3 m as the compression rate of the point cloud data.

Compressor 14 executes the compression control on the point cloud data in the determined compression mode. For example, if the moving body is traveling now, compressor 14 executes the compression control on the point cloud data in a compression mode with the downsampling voxel size of 0.5 m. The point cloud data while the moving object is traveling will be used later for data analysis with a higher probability, requires a high density with a higher probability, and is thus compressed at a lower compression rate. For example, if the moving body is not traveling now, compressor 14 executes the compression control on the point cloud data in a compression mode with the downsampling voxel size of 3 m. The point cloud data while the moving object is not traveling will be used later for data analysis with a lower probability, requires a high density with a lower probability and is thus compressed at a higher compression rate.

Compressor 14 compresses the point cloud data at a lower compression rate while the moving body is transporting passengers, and at a higher compression rate while the moving body is parking.

Adder 15 adds additional information to the compressed data obtained by executing the compression control on the point cloud data (step S65). For example, adder 15 adds the information indicating how much the compression rate of the point cloud data was, as the additional information to the compressed data. This allows the operator to recognize how much the point cloud data has been compressed and processed, when handling the compressed data Then, outputter 16 outputs the compressed data (e.g., the compressed data added with the additional information)(step S66).

As described above, the compression of the point cloud data suitable for the travel of the moving body is possible based on the travel information on the moving body.

In Embodiment 6, information processing device 10 may include none of traffic information obtainer 12a, travel condition obtainer 12b, travel task obtainer 12c, monitoring information obtainer 12d, and processing information obtainer 12e.

Other Embodiments

While information processing device 10 according to one or more aspects of the present disclosure has been described above based on the embodiments. The present disclosure is however not limited to these embodiments. One or more aspects of the present disclosure include other embodiments, such as those obtained by variously modifying the embodiments as conceived by those skilled in the art or those achieved by combining the constituent elements in the embodiments without departing from the scope and spirit of the present disclosure.

For example, the specific area may be an area in which the point cloud is not compressed or reduced by a smaller amount, or an area in which the point cloud is compressed or reduced by a larger amount.

For example, if the moving body includes two or more of sensors such as a radar or a LiDAR sensor, a higher compression rate may be employed in the overlap between the ranges sensed by the sensors. If any of the sensors has a malfunction, a lower compression rate may be employed in the overlap between the ranges.

For example, if there is a communication delay between remote processing server 100 and the moving body, a higher compression rate may be employed. Accordingly, even if there is a communication delay between remote processing server 100 and the moving body, the compressed data is transmitted in a smaller data size, which allows transmission of the compressed data between remote processing server 100 and the moving body.

For example, the point cloud behind, below, and above the moving body less used for the obstacle detection may be compressed at a higher compression rate.

For example, the point cloud at a certain distance in the vicinity of the moving body may be compressed at a higher compression rate.

For example, the point cloud in the area to be less monitored may be compressed at a higher compression rate in accordance with the behavior of the moving body. For example, while the moving body is traveling straight, the point cloud in the area on the right or left of the moving body may be compressed at a higher compression rate. For example, when the moving body changes lanes to the right, the point cloud in the area on the left of the moving body may be compressed at a higher compression rate.

For example, the compression rate of the point cloud may vary depending on the record while the moving body is traveling. For example, if the moving object moves in a place in which the own position can be estimated unstably, the point cloud is compressed at a lower compression rate in the place.

For example, the point cloud may be compressed at a lower compression rate when the moving body is in a place in which an obstacle is less likely to be detected. On the other hand, the point cloud may be compressed at a higher compression rate when the moving body is in a place in which an obstacle is more likely to be detected.

For example, the compression rate of the point cloud may vary depending on the time when the moving body travels. For example, the point cloud may be compressed at a lower compression rate at a time with a larger amount of traffic.

For example, the additional information may include the information indicating the positional relation of the specific area with respect to the moving body (e.g., in front of or behind the moving body). For example, the additional information may include the coordinate information (e.g., the latitude, longitude, or relative coordinate in the vicinity of the moving body) of the point cloud of the compressed data. For example, the additional information may include the information indicating the recommended processing type (e.g., the own position estimation or obstacle estimation) for the point cloud of the compressed data. For example, the additional information may include the information on the point cloud associated with the area recommended for the processing (e.g., the area in which point cloud is not compressed) out of the point cloud of the compressed data. For example, the additional information may include the information indicating the travel conditions (e.g., turning right, turning left, or traveling straight) of the moving body when transmitting the compressed data. For example, the additional information may include the information indicating the conditions of the moving body (e.g., a malfunction of a sensor) when transmitting the compressed data. For example, the additional information may include the information on the compression mode (the downsampling voxel size, the area with the point cloud deleted, a reason for the compression, or the number of frames in which information overlaps). For example, the additional information may include the speed information on the point cloud of the compressed data. For example, the additional information may include the information on the images captured by cameras and the information on the cameras (e.g., the coordinates, types, or viewing angles of the cameras) at the time of obtaining the point cloud of the compressed data. For example, the additional information may include the point cloud surrounding the specific area. That is, in order to identify the specific area, the specific area on the point cloud data is surrounded by the point cloud as the additional information.

For example, while an example has been described where information processing device 10 is mounted on the moving body, information processing device 10 may be included in a server (e.g., remote processing server 100). This case reduces the data size of the point cloud data handled by the server, and thus reduces the processing load of the server.

For example, the compression rate may be controlled in accordance with the communication bandwidth between remote processing server 100 and the moving body. For example, the compression rate may be controlled to increase with a decrease in the communication bandwidth. On the other hand, the compression rate may be controlled to decrease with an increase in the communication bandwidth. Accordingly, the data is transmitted in a data size suitable for the communication bandwidth between remote processing server 100 and the moving body. This reduces the data loss caused by a communication delay or a communication collision.

For example, the compression rate may be controlled in accordance with the travel mode of the moving body. For example, if the travel mode is the fully autonomous mode, the compression rate may be set higher than in the other travel modes. If the travel mode is the remote monitoring mode, the compression rate may be set lower than in the fully autonomous mode and higher than in the remote operation mode. If the travel mode is the remote operation mode, the compression rate may be set lower than in the other travel modes.

Note that the present disclosure may be implemented not only as information processing device 10, but as an information processing method including steps (processing) performed by the constituent elements of information processing device 10.

For example, the information processing method is to be executed by a computer. The method includes the processing of: obtaining point cloud data obtained by sensing a vicinity of a moving body or stored in a point cloud database; obtaining traffic information in the vicinity of the moving body; determining a specific area included in the vicinity of the moving body based on the traffic information; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining a travel condition of the moving body; determining a specific area included in the vicinity of the moving body based on the travel condition; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining a travel task of the moving body; determining a specific area included in the vicinity of the moving body based on the travel task; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining monitoring information from an observer of the moving body or an object in the vicinity of the moving body; determining a specific area included in the vicinity of the moving body based on the monitoring information; executing compression control on first point cloud data and second point cloud data differently from each other, the first point cloud data and the second point cloud data being included in the point cloud data, the first point cloud data being associated with the specific area, the second point cloud data being associated with an area other than the specific area; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining traffic information in the vicinity of the moving body; determining a compression mode for compressing the point cloud data based on the traffic information; executing compression control on the point cloud data in the determined compression mode; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining a travel condition of the moving body; determining a compression mode for compressing the point cloud data based on the travel condition; executing compression control on the point cloud data in the determined compression mode; and outputting compressed data obtained by executing the compression control on the point cloud data For example, the information processing method is to be executed by a computer. The method includes the processing of: obtaining point cloud data obtained by sensing a vicinity of a moving body or stored in a point cloud database; obtaining a travel task of the moving body; determining a compression mode for compressing the point cloud data based on the travel task; executing compression control on the point cloud data in the determined compression mode; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining monitoring information from an observer of the moving body or an object in the vicinity of the moving body; determining a compression mode for compressing the point cloud data based on the monitoring information; executing compression control on the point cloud data in the determined compression mode; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining processing information indicating a detail or a result of processing for autonomous driving of the moving body; determining a compression mode for compressing the point cloud data based on the processing information; executing compression control on the point cloud data in the determined compression mode; and outputting compressed data obtained by executing the compression control on the point cloud data.

For example, the information processing method is to be executed by a computer. The method includes the processing of: obtaining point cloud data obtained by sensing a vicinity of a moving body or stored in a point cloud database; obtaining travel information on the moving body; determining a compression mode for compressing the point cloud data based on the travel information; executing compression control on the point cloud data in the determined compression mode; and outputting compressed data obtained by executing the compression control on the point cloud data.

For example, the present disclosure is implemented as a program to cause a processor to execute the steps included in the information processing methods. The present disclosure is also implemented as a non-transitory computer-readable recording medium, such as a CD-ROM, storing the program.

For example, if the present disclosure is implemented as a program (software), the program is executed using hardware resources such as a CPU, a memory, input/output circuits of a computer to execute the steps. That is, the CPU obtains data from the memory or the input/output circuits to perform calculation, and outputs a result of the calculation to the memory or the input/output circuits to execute the steps.

In the embodiments described above, the constituent elements of information processing device 10 may be implemented by dedicated hardware or by executing software programs suitable for the constituent elements. The constituent elements may be implemented by a program executer such as a CPU or a processor reading and executing the software programs stored in a storage medium such as a hard disk or a semiconductor memory.

Some or all of the functions of information processing device 10 in the embodiments described above may be typically included in an LSI circuit that is an integrated circuit. These functions maybe included in individual chips, or some or all of the functions may be integrated into a chip. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed.

The present disclosure includes other embodiments, such as those obtained by variously modifying the embodiments as conceived by those skilled in the art without departing from the scope and spirit of the present disclosure.

INDUSTRIAL APPLICABILITY

The present disclosure is applicable to a remote-control system for a moving body such as an autonomous driving vehicle.

The invention claimed is:

1. An information processing device comprising:
   a point cloud data obtainer configured to obtain point cloud data obtained by sensing a vicinity of a moving body or stored in a point cloud database;
   at least one of: (i) a traffic information obtainer configured to obtain traffic information in the vicinity of the moving body, (ii) a travel condition obtainer configured to obtain a travel condition of the moving body, (iii) a travel task obtainer configured to obtain a travel task of the moving body, or (iv) a monitoring information obtainer configured to obtain monitoring information from an observer of the moving body or an object in the vicinity of the moving body;
   a determiner configured to determine a specific area included in the vicinity of the moving body and a compression method of compressing first point cloud data that is associated with the specific area, based on the obtained at least one of: (i) the traffic information, (ii) the travel condition, (ii) the travel task, or (iv) the monitoring information;
   a compressor configured to execute compression control on the first point cloud data and second point cloud data using different compression methods, the first point cloud data and the second point cloud data being included in the point cloud data, the second point cloud data being associated with an area other than the specific area; and
   an outputter configured to output compressed data obtained by executing the compression control on the first point cloud data and the second point cloud data.

2. The information processing device according to claim 1, wherein
   the traffic information includes map information or traffic jam information.

3. The information processing device according to claim 1, wherein
   the specific area is based on the traffic information and has a higher probability of an incident than the area other than the specific area.

4. The information processing device according to claim 1, wherein
   the travel condition includes a speed, a steering angle, or an accuracy in estimating an own position of the moving body.

5. The information processing device according to claim 1, wherein
   the specific area is based on the travel condition and is an area within a stopping distance of the moving body.

6. The information processing device according to claim 1, wherein
   the travel task includes a task of turning right or left, changing lanes, or acceleration or deceleration.

7. The information processing device according to claim 1, wherein
   the specific area is based on the travel task and is an area in which the moving body travels while executing the travel task.

8. The information processing device according to claim 1, wherein
   the monitoring information includes information indicating a range monitored by the observer and/or information indicating a range monitored by the object.

9. The information processing device according to claim 1, wherein
   the specific area is based on the monitoring information and is a range monitored by the observer or an overlap between the range monitored by the observer and a range monitored by the object.

10. The information processing device according to claim 1, wherein
    the compressor is configured to execute the compression control (i) to compress one of the first point cloud data and the second point cloud data and not compress a remaining one of the first point cloud data and the second point cloud data or (ii) to vary a reduction amount of the point cloud between the first point cloud data and the second point cloud data.

11. The information processing device according to claim 1, further comprising:
    an adder configured to add additional information on the compression control to the compressed data.

12. An information processing method to be executed by a computer, the information processing method comprising:
    obtaining point cloud data obtained by sensing a vicinity of a moving body or stored in a point cloud database;
    obtaining at least one: (i) traffic information in the vicinity of the moving body, (ii) a travel condition of the moving body, (iii) a travel task of the moving body, or (iv) monitoring information from an observer of the moving body or an object in the vicinity of the moving body;
    determining a specific area included in the vicinity of the moving body and a compression method of compressing first point cloud data that is associated with the specific area, based on the obtained at least one of: (i) the traffic information, (ii) the travel condition, (iii) the travel task, or (iv) the monitoring information;
    executing compression control on the first point cloud data and second point cloud data using different compression methods, the first point cloud data and the second point cloud data being included in the point cloud data, the second point cloud data being associated with an area other than the specific area; and
    outputting compressed data obtained in the executing of the compression control on the first point cloud data and the second point cloud data.

13. A non-transitory computer-readable medium having a computer program stored thereon for causing a computer to execute the information processing method according to claim 12.

14. A moving body comprising an information processing device according to claim 1.

* * * * *